United States Patent [19]

Farris

[11] Patent Number: 4,891,403

[45] Date of Patent: Jan. 2, 1990

[54] CURABLE THERMOSETTING EPOXY-POLYESTER RESIN COMPOSITION

[75] Inventor: Robert D. Farris, Katy, Tex.

[73] Assignee: Shell Oil Company, Houston, Tex.

[21] Appl. No.: 213,444

[22] Filed: Jun. 28, 1988

Related U.S. Application Data

[63] Continuation of Ser. No. 945,272, Dec. 22, 1986, abandoned.

[51] Int. Cl.$^4$ ................. C08L 63/02; C08L 67/06
[52] U.S. Cl. ............................ 525/26; 525/27; 525/31; C08L/63/02; C08L/67/06
[58] Field of Search .................. 525/26, 31, 27

[56] References Cited

U.S. PATENT DOCUMENTS

| | | | |
|---|---|---|---|
| 2,633,458 | 3/1953 | Shokal | 260/45.2 |
| 3,336,241 | 8/1967 | Shokal | 260/2 |
| 3,373,221 | 3/1968 | May | 260/837 |
| 3,377,406 | 4/1968 | Newey et al. | 260/837 |
| 3,508,951 | 4/1970 | Shimp | 525/31 |
| 3,629,362 | 12/1971 | Carlston | 525/31 |
| 3,725,501 | 4/1973 | Hilbelink | 525/29 |
| 3,959,209 | 5/1976 | Lake | 260/40 R |
| 4,302,553 | 11/1981 | Frisch | 525/28 |

OTHER PUBLICATIONS

Lubin, G., *Handbook of Composites*, pp. 24–26, Van Nostrand Reinhold Co., 1982.
Lee, Handbook of Epoxy Resins, McGraw-Hill Book Co., N.Y., pp. 10–17 (1967).

*Primary Examiner*—Patricia Short

[57] ABSTRACT

A curable thermosetting resin composition with improved tensile strength, modulus and glass transition temperatures, without a sacrifice in tensile elongation to break, which comprises a blend of:
(A) an epoxy resin compound containing at least one vicinal epoxy group in the molecule, and with a curing amount a primary or secondary amine containing curing agent; and
(B) a polyester resin with an effective amount of a free radical initiator;
where A and B are blended in a ratio of from about 20:80 to about 80:20% by weight, preferably 40:60 to about 75:25% by weight, and more preferably 60:40 to about 75:25% by weight.

14 Claims, 2 Drawing Sheets

CURABLE THERMOSETTING EPOXY-POLYESTER RESIN COMPOSITION

This is a continuation of application Ser. No. 945,272 filed Dec. 22, 1986, now abandoned.

BACKGROUND OF THE INVENTION

Epoxy compositions and their curing techniques are well known and the patents issued on curable epoxy compositions number in the hundreds. Known curing agents include, among others, polycarboxylic acids and anhydrides, amines, polyamides, imidizoles, and the like. Representative curing agents are described in U.S. Pat. No. 3,336,241. These curing agents may be employed with one or more catalysts or accelerators such as the stannous salts of monocarboxylic acids.

It will be appreciated that each and every one of the known epoxy-curing systems exhibits advantages over other systems, and, as importantly, disadvantages over the same systems. There is, of course, a continuing need to develop better epoxy curing compositions.

The fabrication of thermoset polyester resin articles from curable compositions comprising an ethylenically unsaturated polyester dissolved in a liquid ethylenically unsaturated monomeric crosslinking agent which is capable of polymerizing with the polyester is well known. Articles having relatively high strength and low density can be produced from such compositions by incorporating therein fibrous reinforcements such as glass fibers. Fillers, such as calcium carbonate and clays, are usually added to such compositions as extenders. See for example, U.S. Pat. No. 3,959,209.

For convenience, the term "polyester resin" when used herein refers to a composition which contains as an essential ingredient an ethylenically unsaturated polyester and an ethylenically unsaturated reactive diluent and which may contain other ingredients such as fillers, fibers, reinforcements, curing catalysts, etc.

Polyester resins are widely used in molding applications in liquid form. Such liquid resins comprise a liquid solution of a liquid or solid polyester dissolved in a liquid crosslinking agent, for example, styrene monomer, the most widely used reactive diluent.

For many types of molding applications, it may be desirable for the polyester resin to be in solid form, for example in the form in sheets, granules or powders. Solid forms of polyester resins can be made from the liquid polyester resin solutions mentioned above. For example, a normally liquid polyester resin solution can be converted into solid form by the addition thereto of a chemical thickening agent such as an oxide or hydroxide of magnesium or calcium. Or the liquid polyester resin solution can be converted into solid form by adding thereto a solid filler, such as calcium carbonate, which absorbs the liquid resin. Liquid or solid amorphous polyesters which are soluble in the liquid crosslinking agent are conventionally used in this type of application.

There is a need for a curable thermosetting resin composition which has improved tensile strength, tensile modulus, and glass transition temperatures while adequate tensile strain to break is maintained, over that of "pure" epoxy resin or "pure" polyester resin.

SUMMARY OF THE INVENTION

The present invention provides a curable thermosetting resin composition with improved tensile strength, tensile modulus, and glass transition temperatures, with a retention of tensile strain to break, which comprises a blend of:

(A) 100 parts by weight of a bisphenol based epoxy resin compound containing at least one vicinal epoxy group in the molecule, and with a curing amount of a primary or secondary amine-containing curing agent; and (B) a blend B of 100 parts by weight of a polyester resin with an effective amount of a free radical initiator;

where A and B are blended in a ratio of from about 20:80 to about 80:20% by weight, preferably 50:50 to about 75:25% by weight, and most preferably 65:35 to about 75:25% by weight.

DESCRIPTION OF THE PREFERRED EMBODIMENT

Ingredients

Epoxy Resin

Figure 1:
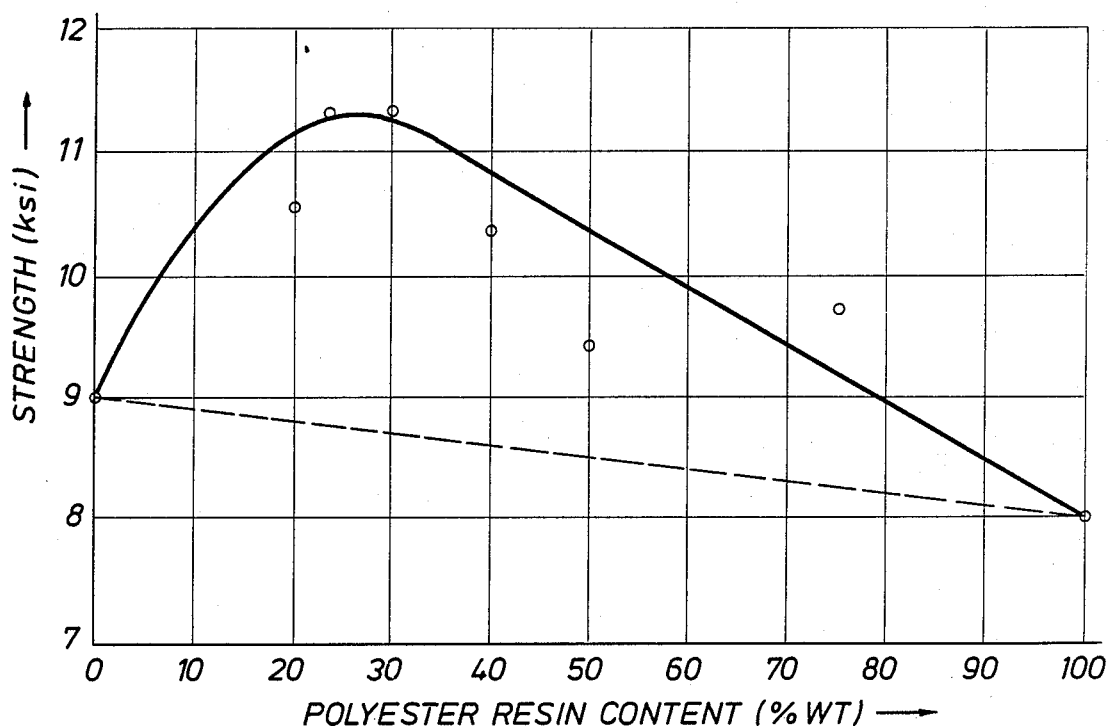
FIG. 1 is a graph of tensile strength of the epoxy-polyester blend in relation to the polyester content in weight percent.

Suitable polyepoxides useful in the present compositions comprise those compounds containing at least one vicinal epoxy group, i.e., at least one

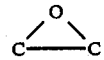

group. These polyepoxides may be saturated or unsaturated, aliphatic, cycloaliphatic aromatic or heterocyclic and may be substituted, if desired, with non-interfering substitutes such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. Nos. 3,373,221 and 3,377,406 and so much of the disclosure relevant to examples of epoxy compounds is incorporated by reference into this specification.

Polyepoxides, which may be used are the glycidyl polyethers of polyhydric phenols and polyhydric alcohols, especially the glycidyl polyethers of 2,2-bis(4- hydroxyphenyl)propane having an average molecular weight between about 300 and 3,000 and an epoxide equivalent weight between about 140 and 2,000. The epoxy resin is commonly bisphenol based. A commonly used epoxy resin is the reaction products of epichlorohydrin and bisphenol-A (Bisphenol of acetone). The bisphenol based epoxy resin compound can contain from about 1% to about 25% by weight styrene monomer and peroxide.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e, by the hydrogenation of glycidyl polyethers of polyhydric phenols or (2) by the reaction of hydrogenated polyhydric phenols with epichlorohydrin in the presence of a suitable catalyst such as Lewis acids, i.e. boron trihalides and complexes thereof, and subsequent dehydrochlorination in an alkaline medium.

An idealized structural formula representing the preferred unsaturated epoxy compound is as follows:

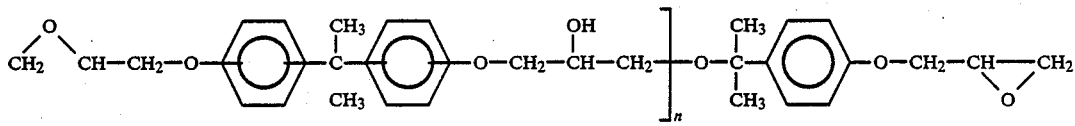

wherein n has a value so that the average molecular weight of the saturated polyepoxide is from about 350 to about 3000.

Unsaturated Polyester

The polyester of this invention should be unsaturated. Unsaturated polyesters are the product of a condensation reaction between difunctional acids and alcohols one of which (generally the acid) contributes olefinic unsaturation. This polymer is dissolved in styrene or other monomeric material containing vinyl unsaturation. With heat and/or free radical initiation, the polyester and reactive diluent crosslink into a solid, non-melting network.

Curing Agents

The curing agent used should contain a primary or secondary amine. An amount is used which is sufficient to cure the blend. For example, an imidazole curing agent may be used. Generally, the amount of imidazole will vary from about 1.5% to about 10%. Other primary or secondary amine percentages required may be individually determined in order to effectuate the curing.

Free Radical Initiator

An effective amount of a free radical initiator is employed. The initiator may be a peroxide, but need not necessarily be a peroxide, such as, but not limited to benzoyl peroxide, tertiary butylhydroperoxide, or ditertiary butylperoxide. The preferred initiator is 2,5-dimethyl-2,5-bis(2-ethyl-hexoyl peroxy)hexane.

In general, the amount of initiator employed will range widely, but will be an amount which is sufficient to effect the desired cure or crosslinking. Preferably, the amount of initiator will vary from about 0.25% to about 5% based on the polyester resin.

The present compositions may be prepared by various techniques. If, for example, the instant compositions are to be utilized within a short time, they can be prepared by simply mixing all the components, adding the customary additives, such as fillers, impact modifiers, reinforcement flake or fibers, mat or webs, pigments, flame retardant agents, plasticizers, stabilizers, extenders, antioxidants and promoters, accelerators, thixotrophic agents, etc. and then molding and curing the composition.

Under certain conditions it may be desirable to utilize a 2-package system utilizing a combination of two or more of the for basic constituents.

The present compositions may be utilized in many applications such as for making various castings and parts.

By the addition of suitable promoters and the like, the present compositions are especially suitable in resin transfer molding (RTM), pressure gellation molding and the like.

The following examples are given to illustrate the preparation of the instant heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples are parts and percentages by weight.

EXPERIMENT 1

A series of unreinforced resin castings were fabricated to determine the effects of adding polyester resins to epoxy resins. A commercial polyester resin (Stypol 8009, Freeman Chemical Company) initiator (U.S. P245, Witco Company) mixture was combined with a commercial epoxy resin EPON Resin 9301, Shell Oil Company) curing agent (EPON 9350 curing agent, Shell Oil Company) mixture at 20 wt %, 25 wt %, 30 wt %, 40 wt %, 50 wt % and 75 wt %. Samples of 100 wt % epoxy resin and 100 wt % polyester resin were also analyzed as controls by which to compare the blends. Table 1 describes the casting mix ratio. Table 2 describes the (A/B) weight ratio at which parts were evaluated.

TABLE 1

| MIX RATIOS | |
|---|---|
| A epoxy resin | 100 parts by weight (pbw) |
| curing agent | 6 |
| B polyester resin | 100 |
| initiator | 0.5 |

TABLE 2

| PARTS EVALUATED AT A/B WT RATIO |
|---|
| 100/0 |
| 80/20 |
| 75/25 |
| 70/30 |
| 60/40 |
| 50/50 |
| 25/75 |
| 0/100 |

Figure 2:
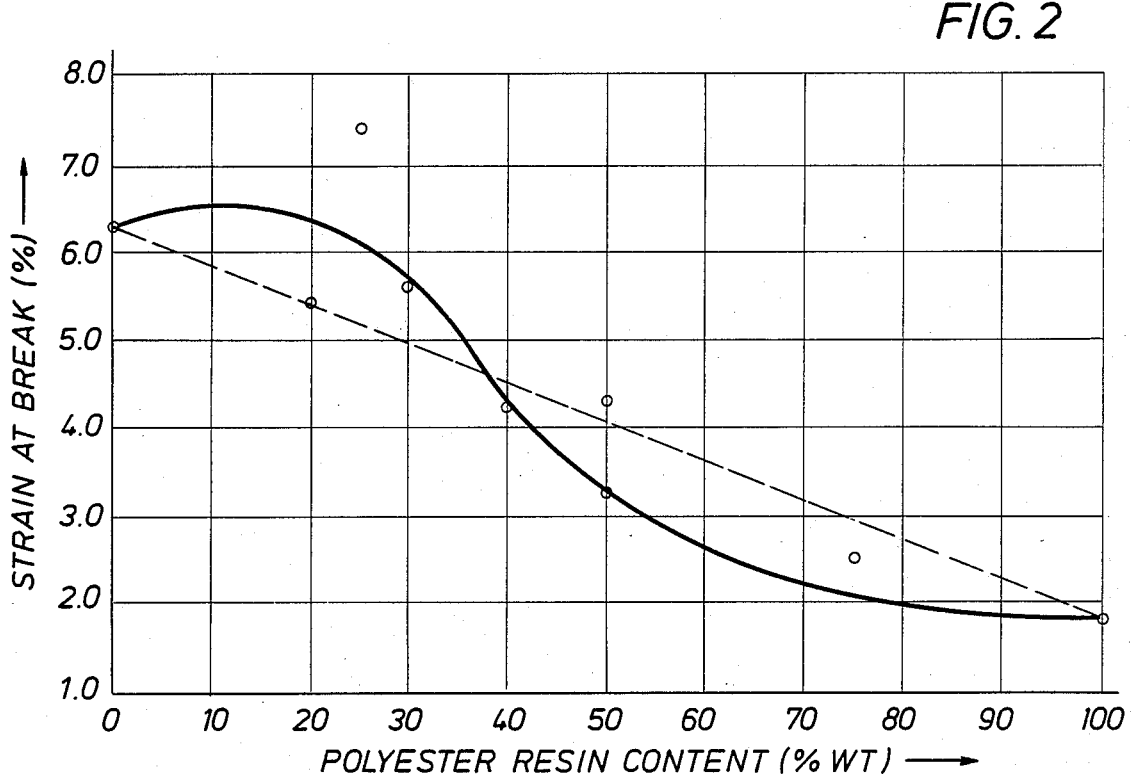
FIG. 2 is a graph of the elongation or strain of the epoxy-polyester blend at break in relation to the polyester content in weight percent.
Figure 3:
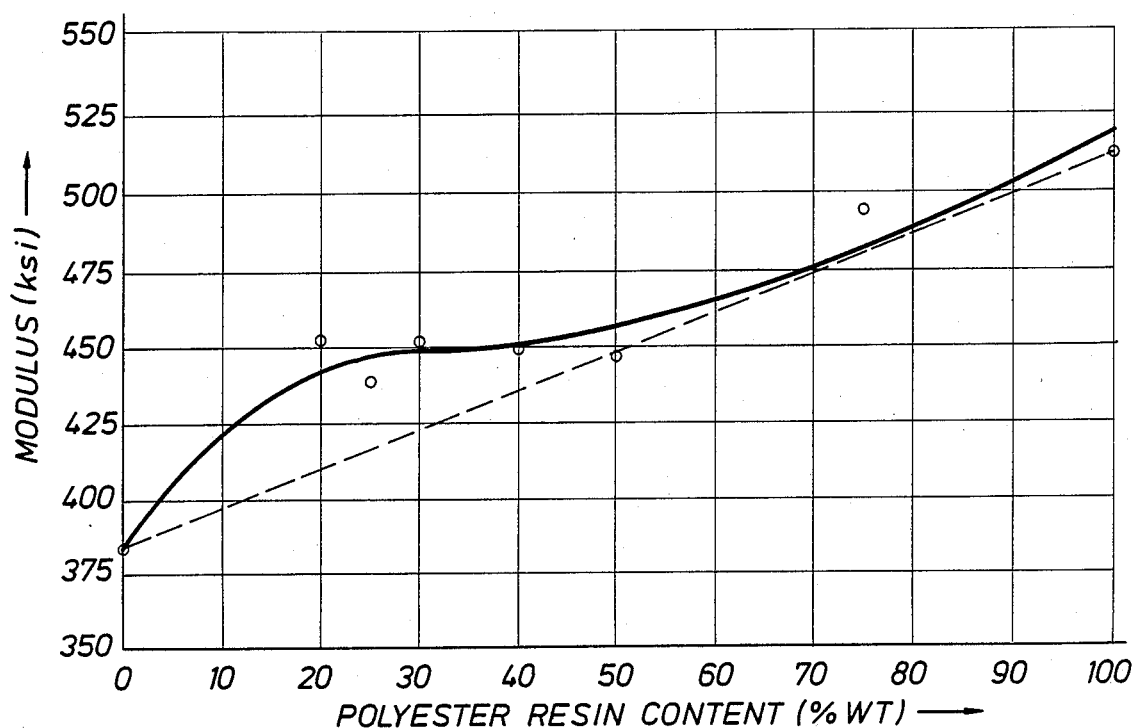
FIG. 3 is a graph of the modulus of the epoxy-polyester blend in relation to polyester resin. The modulus continues to increase as the weight percent of the Stypol is increased.
Figure 4:
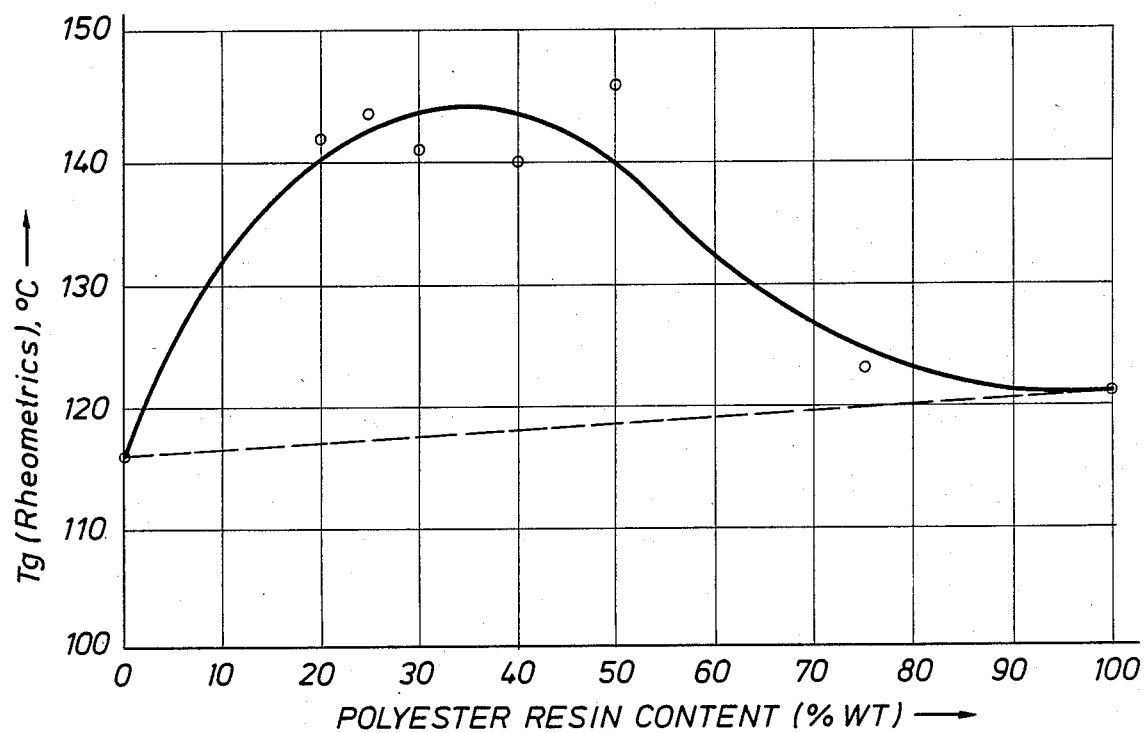
FIG. 4 is a graph of the glass transition temperatures ($T_g$) of the epoxy-polyester blend in relation to the polyester content in weight percent.

FIG. 4 shows a synergistic improvement in glass transition temperatures (as measured by Rheometrics DMA) of the epoxy-polyester blends over the 0/100 and 100/0 epoxy or polyester resins by more than 20° C. FIGS. 1 through 3 show a synergistic improvement in tensile strength and modulus without sacrifice to tensile elongation to break. FIG. 1 is a graph of tensile strength of the epoxy-polyester blend in relation to polyester content in weight percent. As may be seen in FIG. 1, the tensile strength at all blend ratios is improved over tensile strength properties normally expected from an ideal mixture (i.e., indicated by the dashed lines) of epoxy resin and polyester.

FIG. 2 is a graph of the elongation or strain of the Epoxy-polyester blend at break in relation to the strain normally expected from a mixture of epoxy resin and polyester. The elongation or strain at break is not sacrificed by the use of the polyester epoxy blend.

FIG. 3 is a graph of Young's modulus of the Epoxy-polyester blend in relation to the modulus normally expected from a mixture of epoxy resin and polyester. The modulus is improved by the use of the polyester epoxy blend.

FIG. 4 is a graph of the glass transition temperatures ($T_g$) of the epoxy-polyester blend in relation to the Tg normally expected from an ideal mixture of epoxy resin and polyester. A polyester content up to about 80% by weight yielded an improvement over the expected Tg of the epoxy-polyester blend.

The ratio of blends of from about 60:40 to about 75:25 showed the best results, however the other blends also had improved properties, tensile strength and modulus and glass transition temperatures.

What is claimed:

1. A curable thermosetting resin composition comprises a blend of:
   (A) bisphenol based epoxy resin compound containing at least one bisphenol epoxy group in the molecule and with a curing amount of an imidazole curing agent; and
   (B) an ethylenically unsaturated polyester resin containing an ethylenically unsaturated diluent with an effective amount of a free radical initiator,
   where (A) and (B) are blended in a ratio from about 20:80 to about 80:20 parts by weight.

2. The composition of claim 1, wherein said epoxy resin compound contains from about 1.0% by weight to about 25% by weight styrene monomer and peroxide.

3. The composition of claim 1, wherein said free radical initiator is a peroxide.

4. The composition of claim 1, wherein said free radical initiator is 2,5-dimethyl-2,5-bis(2-ethyl-hexoyl peroxy)hexane.

5. The composition of claim 1, in the form of non-tacky, free flowing powders, granules or pellets.

6. The composition of claim 1, wherein said composition is a dry mix.

7. The composition of claim 1, wherein (A) and (B) are blended in a ratio of from about 60:40 to about 75:25.

8. A curable thermosetting resin composition comprises a blend of:
   (A) a bisphenol-based epoxy resin compound containing at least one bisphenol epoxy group in the molecule wherein said bisphenol-based epoxy resin compound contains from about 1% by weight to about 25% by weight of styrene monomer and peroxide, and with a curing amount of an imidazole curing agent; and
   (B) an ethylenically unsaturated polyester resin containing an ethylenically unsaturated diluent with an effective amount of a free radical initiator,
   where (A) and (B) are blended in a ratio of from about 40:60 to about 75:25 parts by weight.

9. The composition of claim 8, wherein said initiator is preferably 2,5-dimethyl-2,5-bis(2-ethyl-hexoyl peroxy)hexane.

10. The composition of claim 8, in the form of non-tacky, free flowing powders, granules or pellets.

11. The composition of claim 8, wherein said composition is a dry mix.

12. A curable thermosetting resin composition comprises a blend of:
   (A) a bisphenol-A-based epoxy resin compound containing at least one bisphenol-A epoxy group in the molecule, wherein said bisphenol-A-based epoxy resin compound contains from about 1.0% by weight to about 25% by weight styrene monomer and peroxide, and with a curing amount of an imidazole curing agent; and
   (B) an ethylenically unsaturated polyester resin containing styrene monomer, with an effective amount of 2,5-dimethyl-25-bis(2-ethyl-hexoyl peroxy) hexane,
   where (A) and (B) are blended in a ratio of from about 60:40 to about 75:25 parts by weight.

13. The composition of claim 12, in the form of non-tacky, free flowing powders, granules or pellets.

14. The composition of claim 12, wherein said composition is a dry mix.

* * * * *